United States Patent
Loganathan et al.

(10) Patent No.: US 10,355,316 B2
(45) Date of Patent: Jul. 16, 2019

(54) HIGH PERFORMANCE LEAD ACID BATTERY WITH ADVANCED ELECTROLYTE SYSTEM

(71) Applicant: Johnson Controls Technology Company, Holland, MI (US)

(72) Inventors: Kavi Geetharani Loganathan, Glendale, WI (US); Junwei Jiang, Whitefish Bay, WI (US); Perry M. Wyatt, Fox Point, WI (US)

(73) Assignee: CPS Technology Holdings LLC, New York, NY (US)

( * ) Notice: Subject to any disclaimer, the term of this patent is extended or adjusted under 35 U.S.C. 154(b) by 471 days.

(21) Appl. No.: 13/942,192

(22) Filed: Jul. 15, 2013

(65) Prior Publication Data

US 2014/0023917 A1    Jan. 23, 2014

Related U.S. Application Data

(60) Provisional application No. 61/672,531, filed on Jul. 17, 2012.

(51) Int. Cl.
```
H01M 4/14      (2006.01)
H01M 4/57      (2006.01)
H01M 10/08     (2006.01)
H01M 10/42     (2006.01)
H01M 4/583     (2010.01)
```
(52) U.S. Cl.
CPC ............ H01M 10/08 (2013.01); H01M 4/14 (2013.01); H01M 4/57 (2013.01); H01M 10/4235 (2013.01); H01M 4/583 (2013.01); H01M 2300/0011 (2013.01)

(58) Field of Classification Search
CPC .................................................. H01M 10/08
USPC ........................................................ 429/204
See application file for complete search history.

(56) References Cited

U.S. PATENT DOCUMENTS 4,425,412 A * 1/1984 Dittmann et al. ............ 429/53
5,945,236 A * 8/1999 Willis .......................... 429/205

OTHER PUBLICATIONS

Ghaemi, M., L. Khosravi-Fard, and J. Neshati. "Improved Performance of Rechargeable Alkaline Batteries via Surfactant-mediated Electrosynthesis of MnO2." Journal of Power Sources 141.2 (2005): 340-50. Web.*

Kubiak, Wladyslaw W., and Ewa Niewiara. "Influence of the Electrolyte on Triton X-100 Adsorption on Fumed Silica." Electroanalysis 17th ser. 14 (2002): 1169-175. Wiley. Web. Mar. 10, 2015.*

(Continued)

*Primary Examiner* — Ula C Ruddock
*Assistant Examiner* — Gregory A Passa
(74) *Attorney, Agent, or Firm* — Fletcher Yoder, P.C.

(57) ABSTRACT

Herein provided is an electrochemical cell electrolyte formed from ingredients comprising: water, sulfuric acid, and at least one octylphenol ethoxylate of Formula 1:

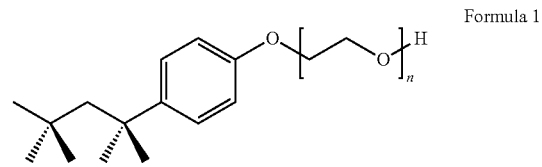

Formula 1 where n is a natural number from at least 1 to at most 16.

19 Claims, 6 Drawing Sheets

(56) References Cited

OTHER PUBLICATIONS

Ghaemi, M., E. Ghafouri, and J. Neshati. "Influence of the Nonionic Surfactant Triton X-100 on Electrocrystallization and Electrochemical Performance of Lead Dioxide Electrode." Journal of Power Sources 157.1 (2006): 550-62. Web.*

* cited by examiner

HIGH PERFORMANCE LEAD ACID BATTERY WITH ADVANCED ELECTROLYTE SYSTEM

CROSS-REFERENCE TO RELATED APPLICATIONS

This application claims the benefit of U.S. Provisional Application No. 61/672,531 entitled "High performance lead acid battery with advanced electrolyte system" filed Jul. 17, 2012, which is incorporated by reference in its entirety.

BACKGROUND

Batteries in hybrid electric vehicle applications operate from partial state of charge and are subjected to short periods of charge and discharge with high currents. High-rate discharge is typical of engine cranking, while high-rate charge is usually associated with regenerative braking. High-rate charge and discharge pulses typically associated with these operating conditions are prone to inducing chemical side-reactions that consume or impede the reactions of some of the active chemicals. In particular, during charging, the potential of the negative electrode may become negative to such extent that hydrogen ions in the solution are reduced, leading to a reduction in charging efficiency and in the unwanted production of hydrogen gas. The production of gas may in turn lead to increases in cell pressure, creating a danger of cell rupture or leakage. Suppression or mitigation of hydrogen gas production would therefore be beneficial to both the performance and operational life of lead-acid batteries.

SUMMARY

In a first aspect, there is provided is an electrochemical cell electrolyte formed from ingredients comprising: water, sulfuric acid, and at least one octylphenol ethoxylate of Formula 1:

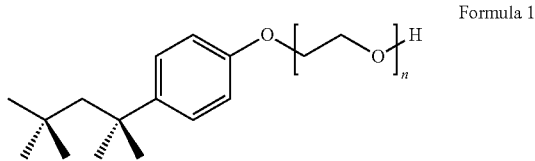

Formula 1 where n is a natural number from at least 1 to at most 16.

In another aspect, there is provided a lead acid battery comprising a positive electrode, a negative electrode, and a cell electrolyte formed from ingredients comprising water, sulfuric acid, and at least one octylphenol ethoxylate of Formula 1:

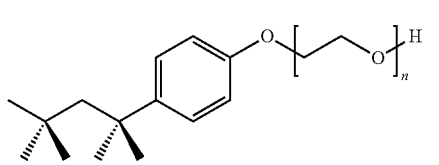

Formula 1 where n is a natural number from at least 1 to at most 16.

In a further aspect, there is provided a method of reducing gassing in a lead acid battery, the method comprising adding at least one octylphenol ethoxylate of Formula 1 to the electrolyte of the battery:

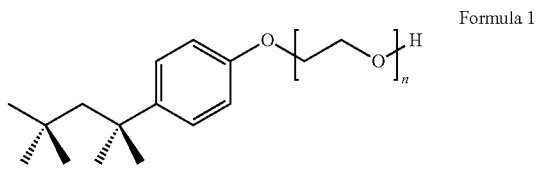

Formula 1 where n is a natural number from at least 1 to at most 16.

DEFINITIONS

As intended herein, the terms "a" and "an" include singular as well as plural references unless the context clearly dictates otherwise. For example, the term "an octylphenol ethoxylate" can include one or more such ethoxylates.

As intended herein, the terms "approximately" and "about" and similar terms have a broad meaning in harmony with the common and accepted usage in the art to which the subject matter of this disclosure pertains.

As intended herein, the "strength" of a sulfuric acid-based lead acid battery electrolyte is determined by comparing its specific gravity to that of an equal volume of pure water. Pure water has a specific gravity (weight) of $1.000 \text{ g·ml}^{-1}$ at 4° C. Pure sulfuric acid has a specific gravity of 1.835. As lead acid battery electrolytes are usually mixtures of sulfuric acid and water, the specific gravity of electrolyte will be more than the 1.000 of the water but less than the 1.835 of the acid. The mixture that is most commonly placed in batteries has a specific gravity of 1.280, and by volume it contains 73% water and 27% sulfuric acid. Often, the specific gravity of the electrolyte is simply referred to as the gravity of the battery. Variations of gravity in the third decimal place are usually referred to as points. For example, 1.284 is four points higher than 1.280.

As intended herein, reference to a chemical compound of a given formula is intended to include the compound as well as its salts, solvates, hydrates and esters.

As intended herein, references to "one embodiment", "an embodiment", or "in embodiments" mean that the feature being referred to is included in at least one embodiment of the disclosure. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the subject matter of the claims can include any variety of combinations and/or integrations of the embodiments described herein.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

Figure 1A:
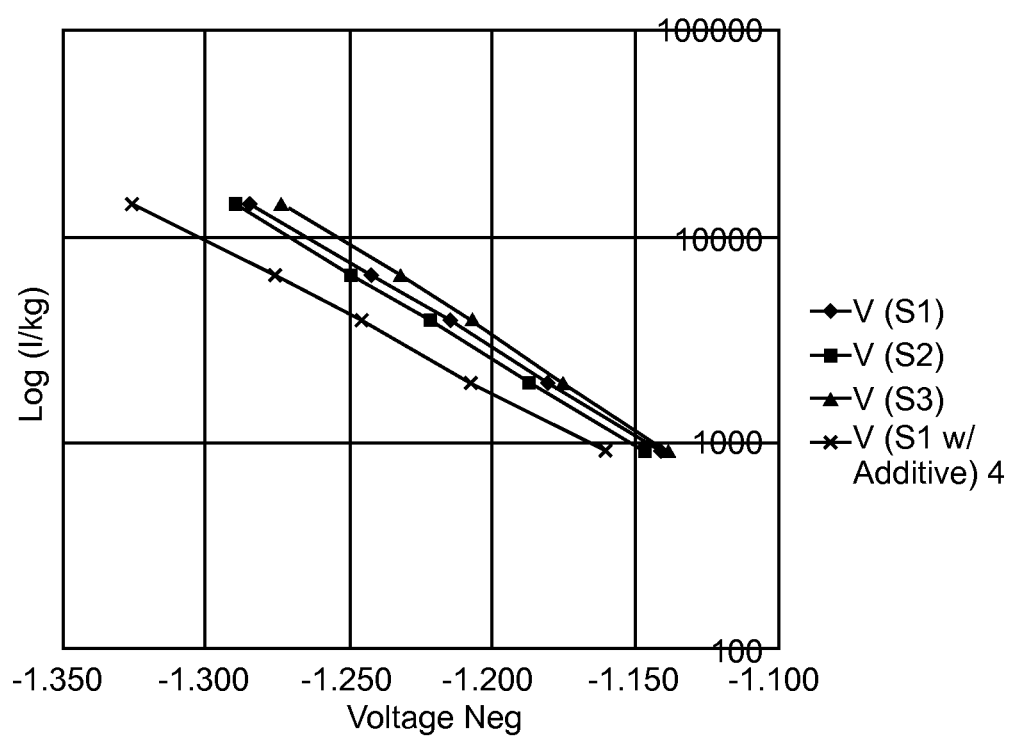
FIG. 1A includes negative electrode plots for three baseline cells without additive (S1, S2, and S3, respectively) and one cell with the additive (cell S1 with Triton™ X-100 added).

The addition of octylphenol ethoxylate surfactants to the electrolyte of lead acid batteries mitigates hydrogen gas evolution at negative overpotentials such as those experienced in the course of high rate charge pulses. Without wishing to be bound to any particular theory, it is believed that, at high pH, the surfactant can attract hydrogen ions (H⁺) and increase the battery charge capacity. The increase in proton transport, which is believed to occur by one or both of the hopping and Grotthuss mechanisms, may decrease residence time and increase the diffusion of the protons, thereby minimizing the production of hydrogen gas.

Accordingly, in one aspect, there is provided an electrochemical cell electrolyte including one or more octylphenol ethoxylates. In the instance of lead acid battery applications, the electrolyte is a mixture formed from ingredients including deionized water, sulfuric acid as commonly used in lead acid batteries. Exemplary octylphenol ethoxylates include those of Formula 1:

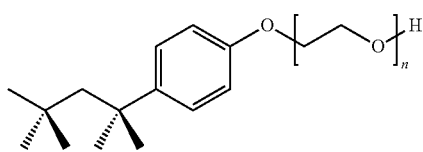

Formula 1 where n is a natural number from at least 1 to at most 16. In some embodiments, number n is at least 4 and at most 14. In preferred embodiments, n is at least 7 to at most 12. In more preferred embodiments, n is at least 8 to at most 11. Commercially available octylphenol ethoxylates may be in the form of two or more compounds differing in the lengths of their respective polyethylene oxide chain. For example, Triton™ X-100 (Dow Chemical Company, Midland, Mich.), is a commercially available mixture of octylphenol ethoxylates having n equal to 9 or 10. In Triton™ X-114, n is equal to 7 or 8, while in Triton™ X-102 n is equal to 12. Several octylphenol ethoxylate formulations where n is 20 or higher are also commercially available. Accordingly, mixtures of different octylphenol ethoxylates may be prepared to suit the needs of the application at hand. Exemplary electrolytes have an overall octylphenol ethoxylate concentration ranging from about 0.0005 wt. % to about 0.015 wt %. Preferably, the overall octylphenol ethoxylate concentration is between about 0.0010 wt % to about 0.010 wt %. More preferably, the overall octylphenol ethoxylate concentration is between about 0.0014 wt % and about 0.005 wt %.

The electrolyte may contain other additives in addition to octylphenol ethoxylate(s), for various reasons such as to increase the capacity of the battery, reduce inner resistance, prolong battery life, or improve its charge/discharge process. Additives commonly used in lead acid batteries include acids such as phosphoric acid (H₃PO₄) and boric acid (H₃BO₃). Sulfate salts, such as sodium sulfate, potassium sulfate, aluminum sulfate, cobalt sulfate, copper sulfate, magnesium sulfate, and cadmium sulfate have also found use as additives in lead acid batteries. Sodium sulfate, for example, is usually added as a buffering agent and for keeping the conductivity of the electrolyte. Commonly employed additives also include carbon suspensions, e.g. colloidal graphite, ultra-fine carbon (UFC) and polyvinyl alcohol (PVA) composite colloids. Polymer materials, such as fluoropolymers, have also been found to improve battery cycle life.

In another aspect, there is provided a lead acid battery including a positive electrode, a negative electrode, and a cell electrolyte formed from ingredients comprising water, sulfuric acid, and at least one octylphenol ethoxylate represented by the above Formula 1. In some embodiments, number n is at least 4 and at most 14. In preferred embodiments, n is at least 7 to at most 12. In more preferred embodiments, n is at least 8 to at most 11. Exemplary batteries have an octylphenol ethoxylate concentration ranging from about 0.0005 wt % to about 0.015 wt %. Preferably, the octylphenol ethoxylate concentration is between about 0.0010 wt % to about 0.010 wt %. More preferably, the octylphenol ethoxylate concentration is between about 0.0014 wt % and about 0.005 wt %.

Cell electrolyte with octylphenol ethoxylate additives are intended for use in all types of lead acid batteries, including enhanced flooded lead acid batteries (EFB), valve-regulated lead-acid (VRLA) batteries, low-maintenance lead-acid rechargeable battery, absorbed glass mat (AGM) batteries, and VRLA AGM batteries. Conventional lead acid batteries are usually comprised of two electrodes: a positive electrode made of lead dioxide (PbO₂) and a negative electrode made of sponge lead (Pb). Both the lead dioxide and sponge lead materials are pasted onto lead grids that act as the current collector. The electrode grids, while primarily constructed of lead, are often alloyed with antimony, calcium, or tin to improve their mechanical characteristics. In a flooded lead-acid battery, positive and negative active material pastes are coated on the positive and negative electrode grids, respectively, forming positive and negative plates. The positive and negative active material pastes usually include lead oxide (PbO or lead (II) oxide). Once the battery is assembled and the electrolyte is added, the battery undergoes a formation step in which a charge is applied to the battery in order to convert the lead oxide of the positive plates to lead dioxide ($PbO_2$ or lead (IV) oxide) and the lead oxide of the negative plates to lead.

After the formation step, a battery may be repeatedly discharged and charged in operation. During battery discharge, the positive and negative active materials react with the sulfuric acid of the electrolyte to form lead (II) sulfate ($PbSO_4$). By the reaction of the sulfuric acid with the positive and negative active materials, a portion of the sulfuric acid of the electrolyte is consumed. However, under normal conditions, sulfuric acid returns to the electrolyte upon battery charging. The reaction of the positive electrode and negative electrode active materials with the sulfuric acid of the electrolyte during discharge may be represented by the following formulae.

Reaction at the Negative Electrode:

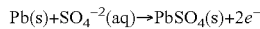

Reaction at the Positive Electrode:

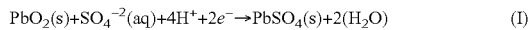

As shown by the foregoing formulae, during discharge, electrical energy is generated, making the lead-acid battery a suitable power source for many applications. For example, flooded lead-acid batteries may be used as power sources for electric vehicles such as forklifts, golf cars, electric cars, and especially hybrid electric vehicles. Lead-acid batteries are also used for emergency or standby power supplies, or to store power generated by photovoltaic systems. To charge the battery, the discharge reaction is reversed by applying a voltage from a charging source. During charging, the lead sulfate reacts with oxygen molecules from ionized water to produce lead and lead dioxide. The lead dioxide is deposited on the positive electrode and the lead is deposited on the negative electrode.

In some embodiments, cell electrolytes including octylphenol additives are also applicable to the set of technologies collectively known as "lead carbon batteries". In such batteries, high surface carbon (e.g. activated carbon, carbon black, carbon fiber, graphite) is present on the negative electrode, usually in the form of a coating of solid carbon or carbon powder applied to a lead current collector, thereby forming a "lead-carbon (Pb/C) electrode" (see, for example, U.S. Pat. No. 8,347,468 to Buiel). In such Pb/C systems, the activated carbon of the negative electrode is not believed to undergo any chemical reaction at all. Instead, the carbon electrode stores the protons ($H^+$) from the acid in a layer on the surface of the electrode. This alternative negative reaction may be represented as follows:

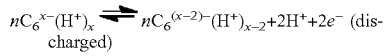

In other words, the carbon electrode acts in a manner similar to a capacitor, releasing and absorbing protons from the electrolyte during discharging and charging. Lead-carbon charges faster than traditional lead plates, and it has been found that the presence of the carbon mitigates negative plate sulfation occurring at high-rate partial-state-of-charge cycling (HRPSoC) regimes typical of hybrid electric vehicles. Also contemplated are embodiments where the electrolyte finds use in hybrid energy storage devices that include two negative electrodes connected in parallel, such as those commercially known as UltraBattery™ (CSIRO, Australia). One of the electrodes is a traditional lead electrode; the other is a lead-carbon electrode. While the activated carbon provides quick energy bursts, the lead electrode stores sufficient energy for longer exertions thanks to its lead-acid chemistry, thereby providing a system operating efficiently in continuous Partial State of Charge (PSoC) use without frequent overcharge maintenance cycles.

EXAMPLES

Tafel Tests

Three-plate cells with two positive electrodes, one negative electrode and a capacity of 13 ampere-hours (Ah) were manufactured and constant current tests at 70, 150, 300, 500, and 1100 mA were applied for six hours with no rest between current steps. The positive electrode was prepared by coating a paste on a lead-tin (Pb/Sn) alloy grid. The paste included lead oxide, sulfuric acid, a carboxymethyl cellulose (CMC) expander, and a conductive carbon paste. The negative electrode material included spongy Pb, lignosulfates, carbon black, and barium sulfate. The electrode plates were assembled in polypropylene cell case and s 1.280 specific gravity mixture of water and sulfuric acid was used as baseline (reference) electrolyte. The current was applied through potentiostats and the change in voltage was measured. Gassing rates were measured without electrolyte additives and in the presence of Triton™ X-100 as electrolyte additive. Unless otherwise indicated, the concentration of the additive, when present, was 0.006 wt %.

Figure 1B:
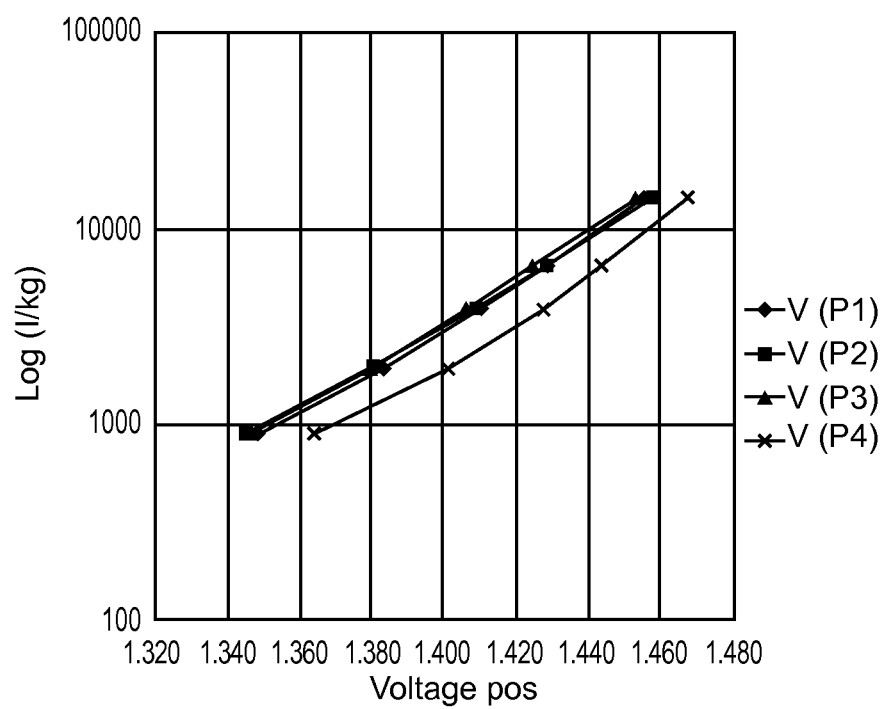
FIG. 1B includes positive electrode plots for three baseline cells (P1, P2, and P3, respectively) and one cell with the additive (P4). The plots of FIG. 1C are for three baseline cells (F1, F2, and F3, respectively) and one cell with the additive.
Figure 1C:
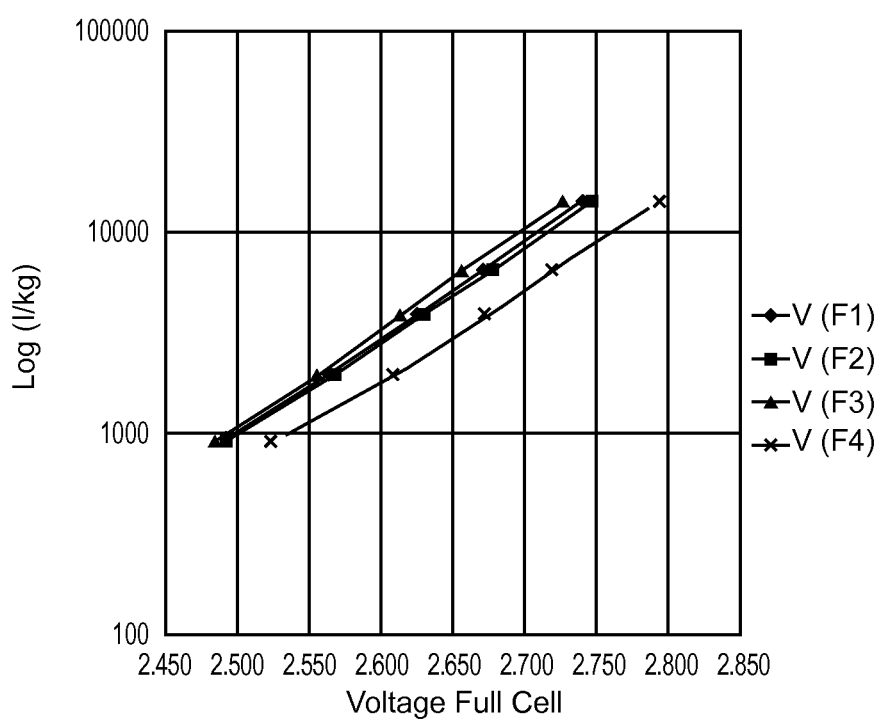
FIG. 1 illustrates Tafel plots from constant current tests performed on single cells having a capacity of 13 amperes-hour, with or without an octylphenol ethoxylate additive.
Figure 2:
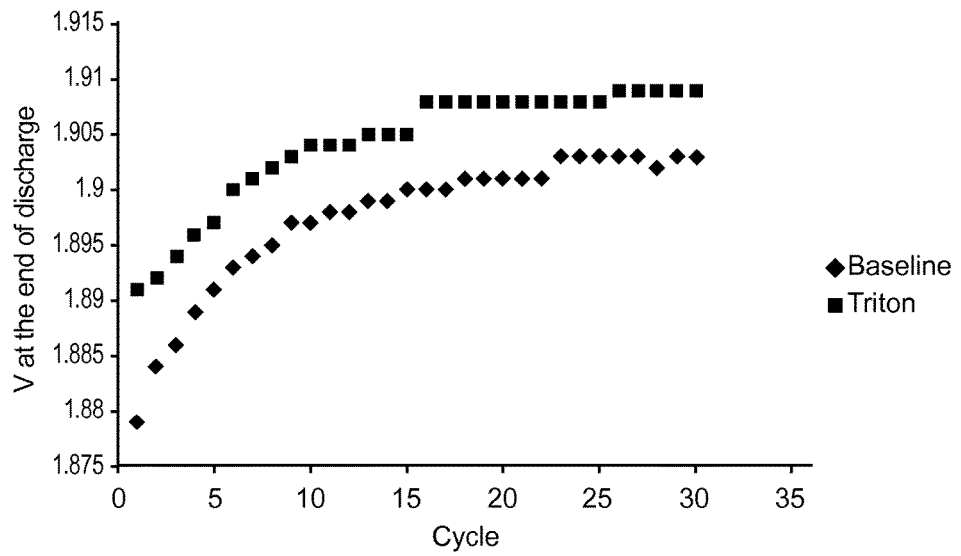
FIG. 2 illustrates cycling data for cells having a capacity of 13 amperes-hour. The baseline reflects an average taken from three cells without the additive. Also plotted is cycling data from a cell modified with the additive.

Before applying the currents, each cell was completely formed and the capacity of the cell was determined by running constant current discharge. As illustrated by the negative electrode, positive electrode, and full scan Tafel plots of FIGS. 1A-1C, the presence of the additive resulted in slower rates of hydrogen evolution than in the case of the reference cells. The cells were also each charged to a 80% state of charge at a charging rate of 2 C to a voltage of 2.4 V for 45 seconds, and then discharged at a rate of 1 C for 30 seconds. FIG. 2 shows that, after the charge-discharge cycle was repeated for 30 times, the voltage drop at the end of discharge was smaller in the presence of the additive.

Cyclic Voltammetry Tests

Figure 3:
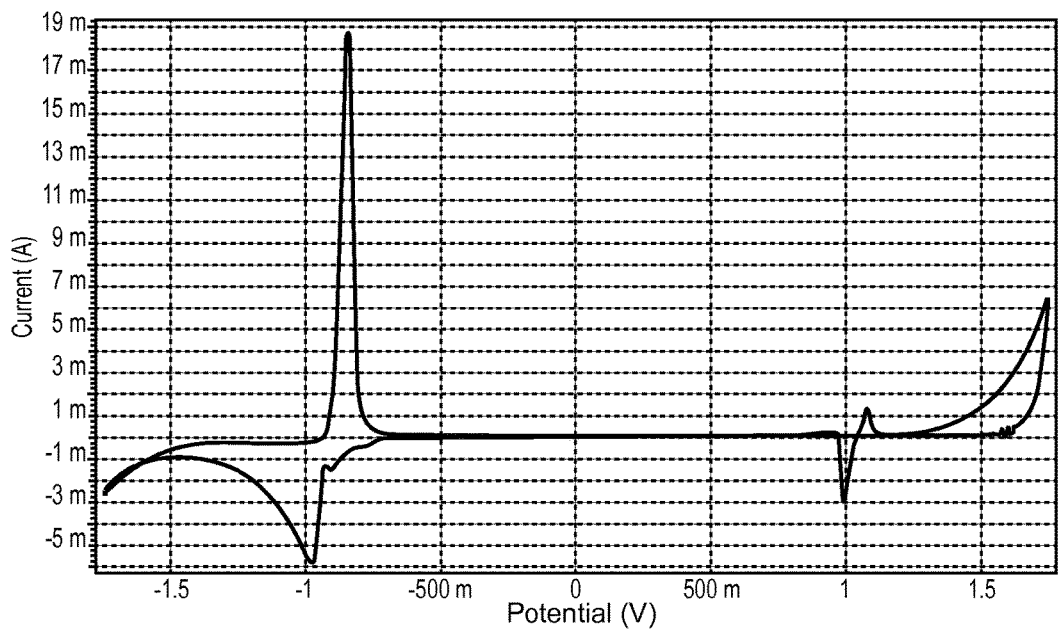
FIG. 3 illustrates cyclic voltammetric studies of a baseline system without octylphenol ethoxylate additives with a platinum (Pt) counter-electrode, a Hg/HgSO₄ reference electrode and lead foil as working electrode.

In order to understand the effects of the decrease in gassing, cyclic voltammetry studies at potentials below the Pb reduction potential were performed, and the evolution of hydrogen was studied. A platinum (Pt) rod was used as the counter electrode. The potential was scanned between −1.5 V to 1.5 V, as measured against a mercury/mercurous sulfate (Hg/$Hg_2SO_4$) reference electrode, at a scan rate of 2 to 5 mV/sec. The current at the working electrode was measured and plotted against the applied voltage. The electrode samples were scanned at 2-5 mV/sec. The voltammogram of FIG. 3 demonstrates the full swing cycling of the baseline system with Pb foil as working electrode material. As seen, the evolution of hydrogen was evidenced when the system was scanned below −1.2V. The hydrogen evolution was normalized over the area of the electrode, and this value was used as the reference point to evaluate the additive which was expected to decrease the hydrogen gassing.

Figure 4:
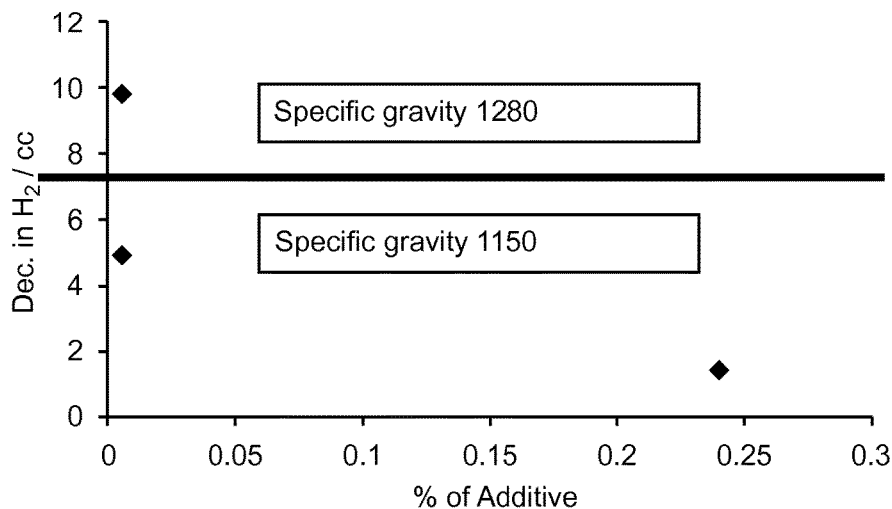
FIG. 4 illustrates a comparative study of gas evolution from cells having different additive and sulfuric acid concentrations.
Figure 5:
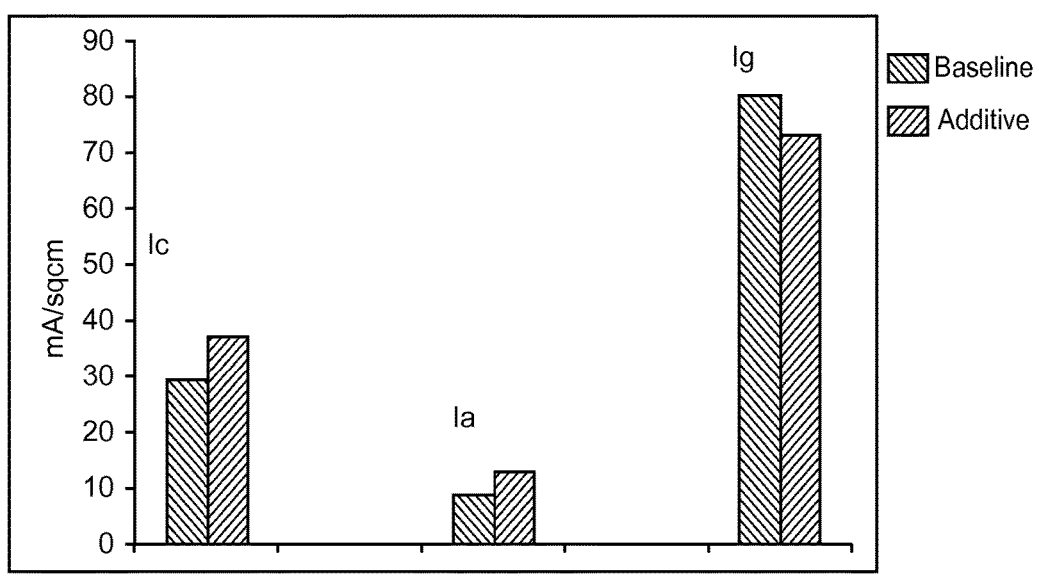
FIG. 5 illustrates a comparison of cathodic (Ic), anodic (Ia), and gassing (Ig) currents for a baseline electrolyte and for an electrolyte with additive.
Figure 6:
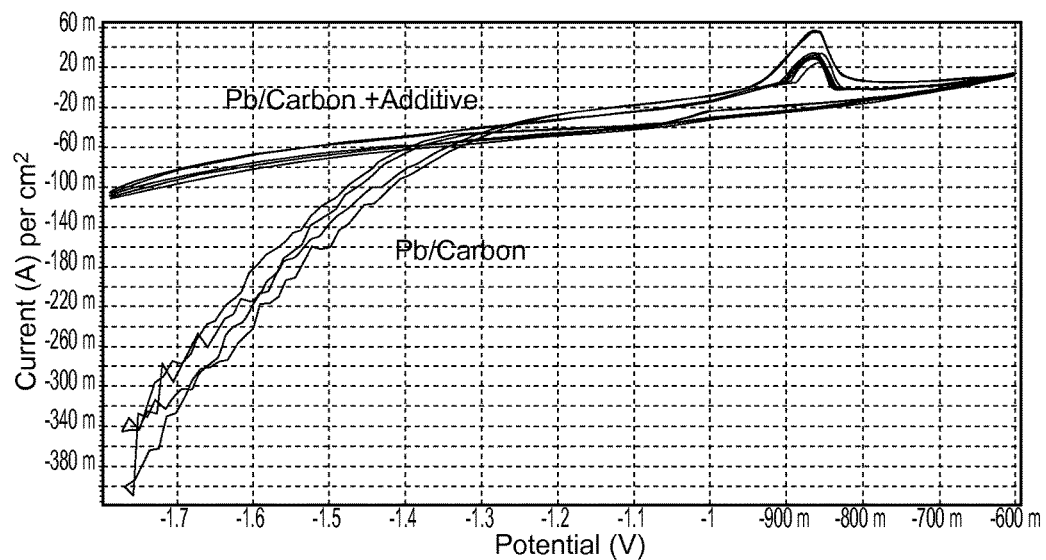
FIG. 6 illustrates cyclic voltammograms conducted on a Pb/C carbon electrode, with or without the additive in the electrolyte. Hg/H₂SO₄ as reference electrode and Pt as counter electrode.
Figure 7:
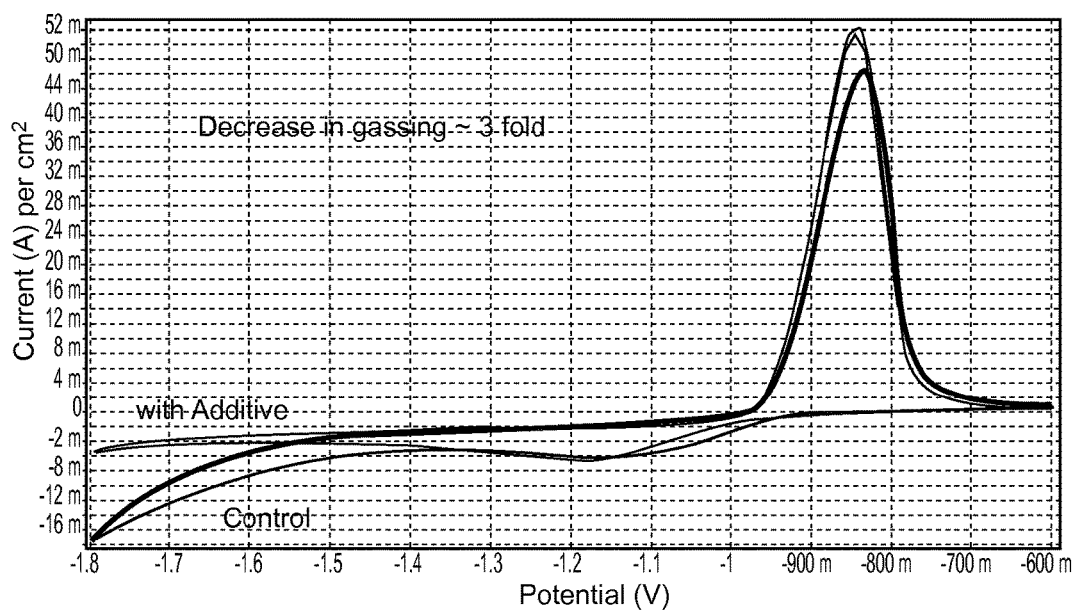
FIG. 7 illustrates cyclic voltammograms conducted on a system having a PbO₂ positive electrode and a Pb negative electrode, with or without the electrolyte additive.

The decrease in hydrogen evolution was evaluated at different electrolyte specific gravities and additive concentrations in the battery electrolyte. As seen in FIG. 4, a decrease in hydrogen gas evolution was seen in both systems. FIG. 5 reports the cathodic (Ic), anodic (Ia), and gassing (Ig) currents in the baseline system and in the presence of the additive. The gassing at all overpotentials tested decreased in the presence of the additive, demonstrating its advantages. As illustrated in FIG. 6, for example, the amount of hydrogen evolution dropped three-fold in an electrolyte of specific gravity 1.280 when the working electrode was brought down to a potential of −1.8 V at scan rates in the 2-5 mV/sec range. As shown in FIG. 7, a three-fold reduction in gassing was obtained when the current collector was a negative capacitor electrode prepared by coating a high surface area activated carbon on a lead-based substrate ("Pb/C system").

It is important to note that the preparation of lead acid battery electrolytes and electrochemical cells as shown in the examples above is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

Furthermore, the technical effects and technical problems in the present specification are exemplary and not limiting. It should be noted that the embodiments described in the present specification may have other technical effects and can solve other technical problems.

What is claimed is:

1. An electrochemical cell electrolyte formed from ingredients comprising: water, sulfuric acid, one or more sulfate salts, and at least one octylphenol ethoxylate of Formula 1:

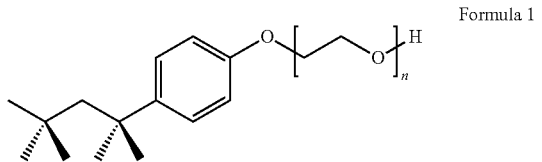

Formula 1 where n is a natural number from at least 1 to at most 16, wherein the octylphenol ethoxylate is present at a concentration effective to substantially reduce hydrogen gas evolution when a lead-acid battery having the electrochemical cell electrolyte is subjected to an overpotential, and wherein the one or more sulfate salts of the electrochemical cell electrolyte consist of sodium sulfate, potassium sulfate, aluminum sulfate, cobalt sulfate, copper sulfate, magnesium sulfate, cadmium sulfate, or any combination thereof.

2. The cell electrolyte of claim 1, where n is a natural number from at least 4 to at most 14.

3. The cell electrolyte of claim 1, where n is a natural number from at least 7 to at most 12.

4. The cell electrolyte of claim 1, where n is a natural number from at least 8 to at most 11.

5. The cell electrolyte of claim 1, where the octylphenol ethoxylate concentration is at least 0.0005 wt % to at most 0.015 wt %.

6. The cell electrolyte of claim 1, where the octylphenol ethoxylate concentration is at least 0.0010 wt % to at most 0.010 wt %.

7. The cell electrolyte of claim 1, where the octylphenol ethoxylate concentration is at least 0.0014 wt % and at most 0.005 wt %.

8. The cell electrolyte of claim 1, where the one or more sulfate salts of the electrochemical cell electrolyte consist of sodium sulfate or potassium sulfate, or a combination thereof.

9. A lead acid battery comprising a positive lead-based electrode, a negative lead-based electrode, and a cell electrolyte formed from ingredients comprising water, sulfuric acid, one or more sulfate salts, and at least one octylphenol ethoxylate of Formula 1:

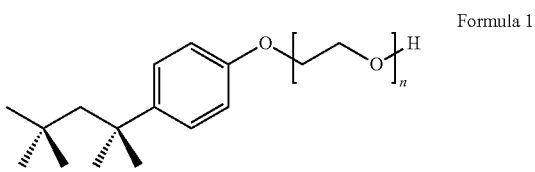

Formula 1 where n is a natural number from at least 1 to at most 16, wherein the octylphenol ethoxylate is present at a concentration effective to substantially reduce hydrogen gas evolution when the lead acid battery is subjected to an overpotential, and wherein the one or more sulfate salts of the cell electrolyte consist of sodium sulfate, potassium sulfate, aluminum sulfate, cobalt sulfate, copper sulfate, magnesium sulfate, cadmium sulfate, or any combination thereof.

10. The lead acid battery of claim 9, where the positive electrode is a $PbO_2$ electrode and the negative electrode is a sponge lead electrode.

11. The lead acid battery of claim 9, where the positive lead-based electrode is a $PbO_2$ electrode and the negative lead-based electrode is a carbon-coated lead electrode.

12. The lead acid battery of claim 9, wherein the negative lead-based electrode includes a first sponge lead negative electrode and a second carbon-coated lead negative electrode.

13. The lead acid battery of claim 9, where the battery is a lead carbon hybrid battery.

14. The lead acid battery of claim 9, where n is a natural number from at least 4 to at most 14.

15. The lead acid battery of claim 9, where n is a natural number from at least 7 to at most 12.

16. The lead acid battery of claim 9, where n is a natural number from at least 8 to at most 11.

17. The lead acid battery of claim 9, where the octylphenol ethoxylate concentration is at least 0.0005 wt % to at most 0.015 wt %.

18. The lead acid battery of claim 9, where the octylphenol ethoxylate concentration is at least 0.0010 wt % to at most 0.010 wt %.

19. The lead acid battery of claim 9, where the octylphenol ethoxylate concentration is at least 0.0014 wt % and at most 0.005 wt %.

* * * * *

UNITED STATES PATENT AND TRADEMARK OFFICE
CERTIFICATE OF CORRECTION

PATENT NO. : 10,355,316 B2
APPLICATION NO. : 13/942192
DATED : July 16, 2019
INVENTOR(S) : Kavi Geetharani Loganathan et al.

Page 1 of 1

It is certified that error appears in the above-identified patent and that said Letters Patent is hereby corrected as shown below:

In the Specification

1. In Column 4, Line 17, delete "0.0005 wt. %" and insert -- 0.0005 wt % --, therefor.

2. In Column 4, Line 55, delete "enhanced flooded lead acid batteries (EFB)," and insert -- enhanced flooded battery (EFB), --, therefor.

3. In Column 4, Line 55, delete "enhanced flooded lead acid batteries (EFB)," and insert -- enhanced flooded battery (EFB), --, therefor.

4. In Column 6, Line 21, delete "lignosulfates," and insert -- lignosulfonates, --, therefor.

Signed and Sealed this
Tenth Day of September, 2019

Andrei Iancu
*Director of the United States Patent and Trademark Office*